(12) United States Patent
Shi et al.

(10) Patent No.: US 11,511,200 B2
(45) Date of Patent: Nov. 29, 2022

(54) GAME PLAYING METHOD AND SYSTEM BASED ON A MULTIMEDIA FILE

(71) Applicant: Shanghai Bilibili Technology Co., Ltd., Shanghai (CN)

(72) Inventors: Yingxuan Shi, Shanghai (CN); Yong Wu, Shanghai (CN); Chaoran Li, Shanghai (CN); Yihong Zhong, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/402,194

(22) Filed: Aug. 13, 2021

(65) Prior Publication Data
US 2022/0047954 A1 Feb. 17, 2022

(30) Foreign Application Priority Data
Aug. 14, 2020 (CN) .......................... 202010817431.2

(51) Int. Cl.
*A63F 13/814* (2014.01)
*A63F 13/65* (2014.01)

(52) U.S. Cl.
CPC ............ *A63F 13/814* (2014.09); *A63F 13/65* (2014.09)

(58) Field of Classification Search
CPC ........ A63F 13/23; A63F 13/25; A63F 13/424; A63F 13/44; A63F 13/45; A63F 13/50; A63F 13/52; A63F 13/65; A63F 13/814; A63F 2300/6063; A63F 2300/6072; A63F 2300/638; A63F 2300/8047
See application file for complete search history.

(56) References Cited

U.S. PATENT DOCUMENTS

| | | | | |
|---|---|---|---|---|
| 6,268,557 | B1* | 7/2001 | Devecka | G10H 1/361 84/743 |
| 2006/0266200 | A1* | 11/2006 | Goodwin | A63F 13/814 84/611 |
| 2008/0311970 | A1* | 12/2008 | Kay | A63F 13/814 463/7 |
| 2010/0173709 | A1* | 7/2010 | Horovitz | G06V 30/304 463/35 |
| 2010/0304810 | A1* | 12/2010 | Stoddard | A63F 13/52 463/31 |
| 2014/0080606 | A1* | 3/2014 | Gillet | A63F 13/63 463/35 |
| 2014/0155157 | A1* | 6/2014 | Hazama | A63F 13/00 463/31 |

(Continued)

*Primary Examiner* — Omkar A Deodhar
(74) *Attorney, Agent, or Firm* — BakerHostetler (57) ABSTRACT

The present disclosure describes techniques of generating and playing games associated with a multimedia file. The techniques comprises obtaining a target audio signal from a multimedia file; determining a plurality of rhythm points in the target audio signal; configuring a plurality of interactive components corresponding to the plurality of rhythmic points based on one or more predetermined rules monitoring a progress of playing the multimedia file; and displaying a target interactive component on an interface of playing the multimedia file in response to determining that the progress reaches a time point corresponding to one of the plurality of rhythmic points.

20 Claims, 8 Drawing Sheets

(56) References Cited

U.S. PATENT DOCUMENTS

| | | | | |
|---|---|---|---|---|
| 2014/0370982 A1* | 12/2014 | Liu | ............... | A63F 13/92 |
| | | | | 463/31 |
| 2015/0194070 A1* | 7/2015 | Sakai | ............... | G09B 19/0015 |
| | | | | 434/250 |
| 2016/0175718 A1* | 6/2016 | Yoo | ............... | A63F 13/424 |
| | | | | 463/35 |
| 2018/0214777 A1* | 8/2018 | Hingorani | ............... | A63F 13/5255 |

\* cited by examiner

GAME PLAYING METHOD AND SYSTEM BASED ON A MULTIMEDIA FILE

CROSS-REFERENCE TO RELATED APPLICATION

The present application declares priority of the Chinese patent application with number CN202010817431.2, filed on Aug. 14, 2020, entitled "Game playing method and system based on a multimedia file", the disclosure of which is incorporated by reference herein in its entirety.

BACKGROUND

There is more and more interaction between users and computer devices such as tablets and mobile phones, for example, watching movie videos or game videos. With the popularization of concepts such as augmented reality and virtual reality, people are increasingly demanding computer devices for entertainment. However, when playing video content such as movies and cross-talks, current computer devices provide a single output form and few interactive ways, resulting in a poor user experience, which has obviously failed to meet people's current entertainment needs.

SUMMARY

The purpose of embodiments of the present application is to provide a game playing method based on a multimedia file, system, computer device, and computer-readable storage medium to solve the following problems: in the prior art, when playing video content such as movies and cross-talks, current computer devices provide a single output form, few interactive ways, and a poor user experience.

On one aspect of the embodiments of the present application provides a game playing method based on a multimedia file, and the method includes: playing the multimedia file; separating the multimedia file to obtain a target audio signal; obtaining multiple rhythmic points in the target audio signal; configuring a corresponding interactive component for each of the rhythmic points; monitoring a playing progress of the multimedia file; and when the playing progress reaches a time node corresponding to a certain one of the rhythmic points, displaying a target interactive component on a playing interface of the multimedia file; wherein, the target interactive component is an interactive component corresponding to the certain one of the rhythmic points.

On another aspect of the embodiments of the present application provides a game playing system based on a multimedia file, and the system includes: a playing module 1010, playing the multimedia file; a separating module 1020, separating the multimedia file to obtain a target audio signal; an obtaining module 1030, obtaining multiple rhythmic points in the target audio signal; a configuring module 1040, configuring a corresponding interactive component for each of the rhythmic points; a monitoring module 1050, monitoring a playing progress of the multimedia file; and an interactive module 1060, when the playing progress reaches a time node corresponding to a certain one of the rhythmic points, displaying a target interactive component on a playing interface of the multimedia file; wherein, the target interactive component is an interactive component corresponding to the certain one of the rhythmic points.

On another aspect of the embodiments of the present application, a computer device is provided, which includes a memory, a processor, and computer programs that stored in the memory and operable on the processor, wherein the computer programs are executed by the processor to implement steps of the game playing method based on a multimedia file described above.

On another aspect of the embodiments of the present application, a computer-readable storage medium is provided, which stores computer programs that upon execution by at least one processor cause the at least one processor to implement steps of the game playing method based on a multimedia file described above.

The game playing method based on a multimedia file, system, computer device, and computer-readable storage medium provided in the embodiments of the present application enables the computer device to combine the audio content to pop up the corresponding interactive component at the playing moment of the audio rhythmic point for the user's interactive operation in the process of playing the multimedia file. That is, in the process of playing the multimedia file, the computer device effectively increases interactive modes of an audio game and improves the user's experience when viewing the multimedia file.

DETAILED DESCRIPTION OF ILLUSTRATIVE EMBODIMENTS

In order to make the purpose, technical solutions, and advantages of the present application clearer, the following further describes the present application in detail with reference to the accompanying drawings and embodiments. It should be understood that the specific embodiments described here are only used to explain the present application, and not used to limit the present application. Based on the embodiments in the present application, all other embodiments obtained by those of ordinary skills in the art without creative work are falling within the protection scope of the present application.

It should be noted that the descriptions related to "first", "second" and so on in the embodiments of the present application are only for descriptive purposes, and cannot be understood as indicating or implying their relative importance or implicitly specifying the indicated technical features quantity. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, and is not within the scope of protection required by the present application.

In the description of the present application, it should be understood that the numerical label before the steps does not identify the sequence of execution of the steps, and is only used to facilitate the description of the present application and distinguish each step, and therefore cannot be understood as a limitation of the present application.

The computer device 2 may be configured to provide multimedia playing services. The multimedia play services may be configured to receive content via various transmission technologies and play the received content. The content may include content streams (for example, video streams, audio streams), content files (for example, a video file, an audio file), and/or other data.

The computer device 2 may be configured to access the content and services of a provider network 4. The computer device 2 may be a mobile device such as a smart phone, a tablet device, an augmented reality/virtual reality device. The computer device 2 may be associated with one or more users. A single user can use the computer device 2 to access the provider network 4. The computer device 2 can travel to various locations and use different networks to access the provider network 4.

The computer device 2 may include an application 2A and other applications. The application 2A outputs (such as displays, renders, and presents) the content to the user. The application 2A may be a multimedia player (such as a bilibili client), a browser client, and so on. As an example, FIG. 1 displays a video screen when the application 2A plays a cartoon video.

Figure 1:
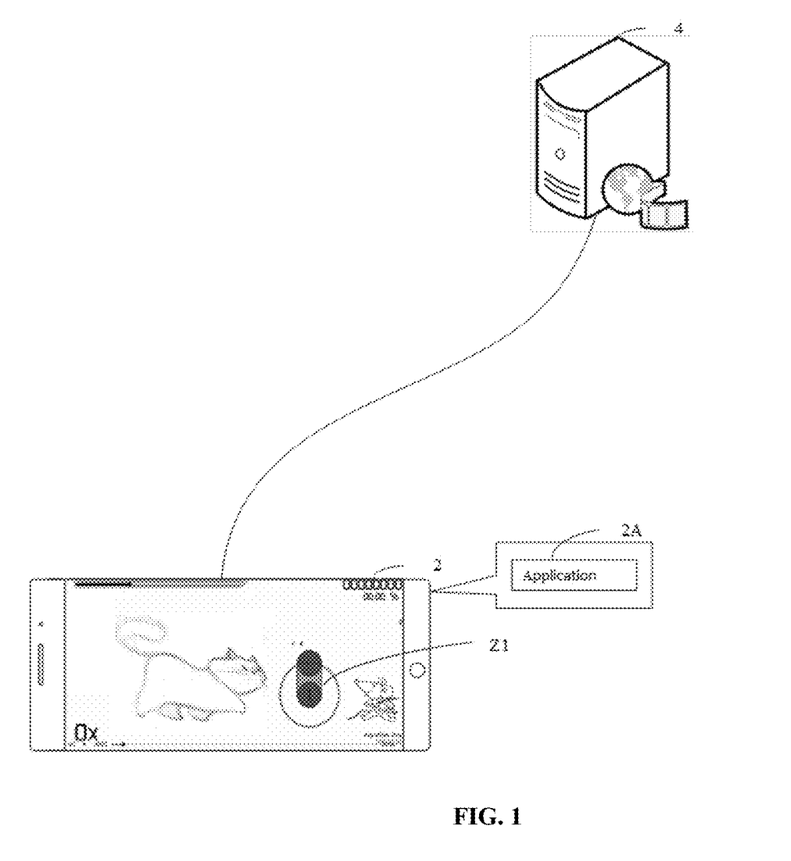
FIG. 1 schematically shows an application environment diagram of a game playing method based on a multimedia file according to an embodiment of the present application.

As shown in FIG. 1, under an audio game mode, the computer device 2 can perform the following operations: generating different interactive components (such as Z1) in real-time according to the video file, and using the video screen of the video file as a game background of the interactive component (such as Z1), which enables users to experience audio games while watching the video screen of the video file, so as to achieve a multi-faceted experience of vision, hearing and human-computer interaction, and increase user's interest. It should be understood that a video scene shown in FIG. 1 is exemplary and is not used to limit the scope of protection of the present application.

A First Embodiment

Figure 2:
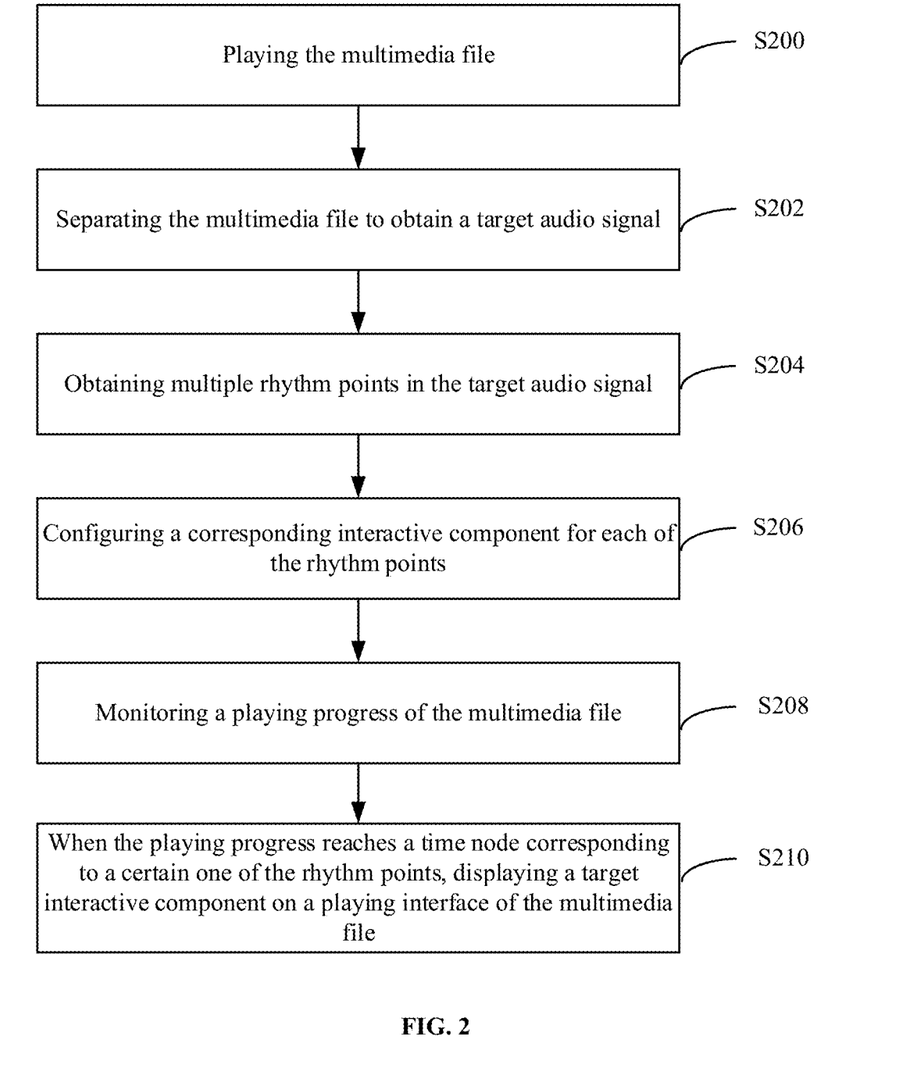
FIG. 2 schematically shows a flowchart of a game playing method based on a multimedia file according to a first embodiment of the present application.

FIG. 2 schematically shows a flowchart of a game playing method based on a multimedia file according to a first embodiment of the present application. The following is an exemplary description using a computing device 2 as an executive body. As shown in FIG. 2, the game playing method based on a multimedia file may include steps S200 to S210, wherein:

Step S200, Playing the Multimedia File.

The multimedia file may include various types of audio and video content, such as music, cross-talk, or other types of content. For music type, pure music content without lyrics can be included, or music content with lyrics can be included.

The multimedia file may be a local file in the computer device 2 or an online file obtained through the Internet.

Step S202, Separating the Multimedia File to Obtain a Target Audio Signal.

In order to improve the accuracy of detecting rhythmic points in the multimedia file, the target audio signal is an audio signal without noise signal interference or the noise signal interference being controlled within a preset range, or an audio signal after removing noise signals.

Which signals in the multimedia file can be considered as noise signals is determined according to a source of rhythmic points. For different types of content, users focus on a different sense of rhythm, and sources of the rhythmic points may also be different. In an exemplary embodiment, a source of the rhythmic points may be determined according to classification, introduction, and comment keywords of the multimedia file. For example, music-type audio and video content often has a sense of rhythm from music beats and so on, so the rhythmic points can be music drums or sounding points of lyrics. The rhythm of cross-talk-type audio and video content often comes from word rhythms of cross-talk performers, so the rhythmic points may be sounding points of each word or the sounding points with an accent.

Figure 3:
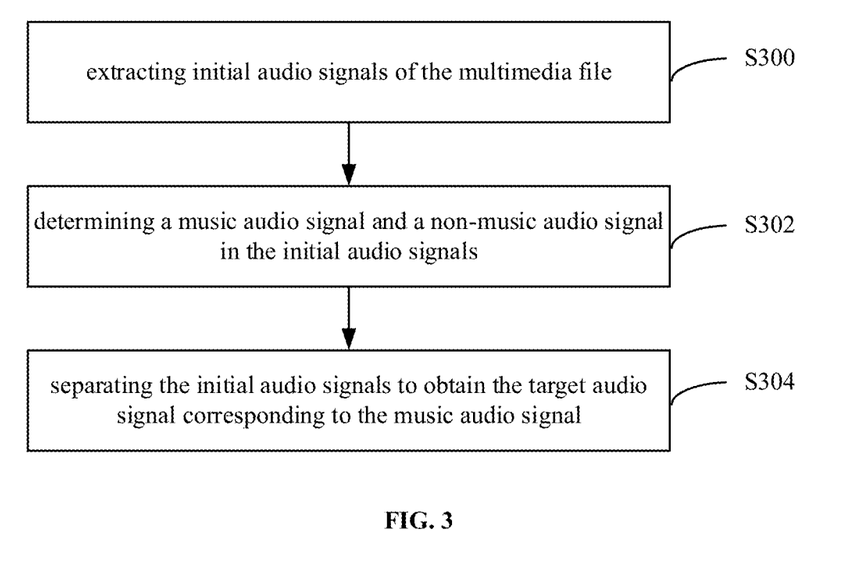
FIG. 3 is a flowchart of sub-steps of step S202 in FIG. 2.

As an example, the multimedia file is a music-type audio and video content, and the computer device 2 can search for rhythmic points from a music audio signal in the multimedia file. That is, the computer device 2 may use the music audio signal as the target audio signal and a non-music audio signal as a noise signal. In subsequent operations, an interactive component that interacts with a user is generated based on these rhythmic points, so that the user can interact with audio beats. As shown in FIG. 3, step S202 may include steps S300 to S304, wherein: step S300, extracting initial audio signals of the multimedia file; step S302, determining the music audio signal and the non-music audio signal in the initial audio signals; and step S304, separating the initial audio signals to obtain the target audio signal corresponding to the music audio signal. In some embodiments, the computer device 2 can separate the music audio signal and the non-music audio signal in the initial audio signals through a trained deep neural network model or the like. Of course, the computer device 2 may also implement the separation operation in step S402 in other ways, such as time domain or frequency domain analysis.

Step S204, Obtaining Multiple Rhythmic Points in the Target Audio Signal.

The multiple rhythmic points may be music drums, sounding points of lyrics, sounding points of each word in the process of performing a cross-talk program, and the like.

First, the multiple rhythmic points are the music drums.

Figure 4:
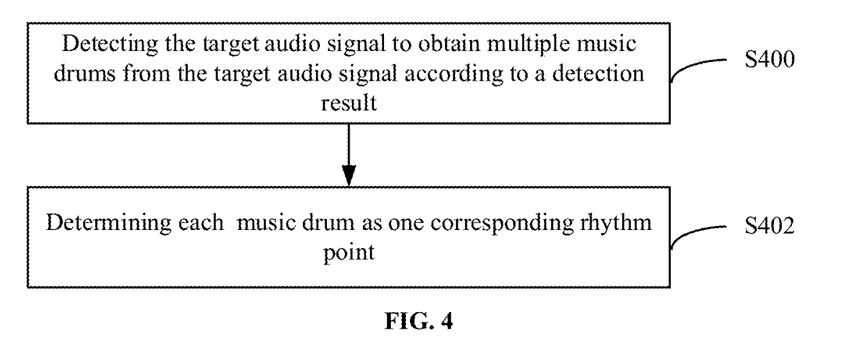
FIG. 4 is a flowchart of sub-steps of step S204 in FIG. 2.

In order to detect the multiple rhythmic points effectively and quickly, as shown in FIG. 4, step S204 may include steps S400 to S402, wherein: step S400, detecting the target audio signal to obtain multiple music drums from the target audio signal according to a detection result; and step S402, determining each of the music drums as one corresponding rhythmic point.

The music drums may be strong drums and/or weak drums, and maybe audio segments or audio points whose energy change range exceeds a first threshold, pitch change range exceeds a second threshold, or timbre change range exceeds a third threshold.

The computer device 2 can implement the detection operation in step S400 through the trained deep neural network model, time-domain analysis, or frequency domain analysis. Wherein, the deep neural network model is to identify the multiple music drums through audio features in the target audio signal. The time-domain analysis is to find the multiple music drums by calculating an energy accumulation of the waveform file. The frequency-domain analysis is to find the multiple music drums by calculating spectral energy changes.

Second, the multiple rhythmic points are the sounding points of lyrics.

Figure 5:
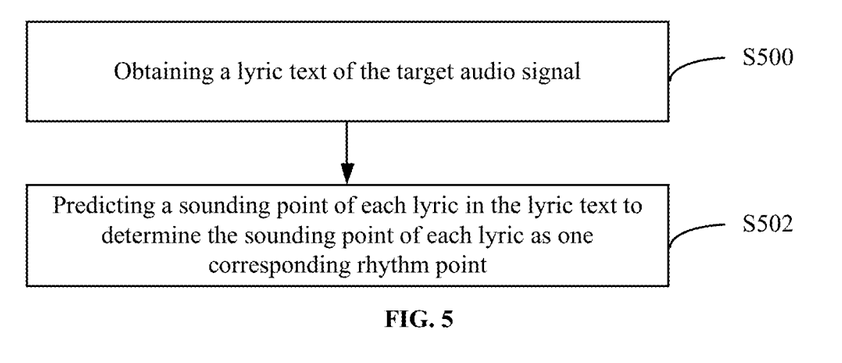
FIG. 5 is another flowchart of sub-steps of step S204 in FIG. 2.

In order to detect the multiple rhythmic points effectively and quickly, as shown in FIG. 5, step S204 may include steps S500 to S502, wherein: step S500, obtaining a lyric text of the target audio signal; and step S502, predicting a sounding point of each lyric in the lyric text to determine the sounding point of each lyric as one corresponding rhythmic point.

The sounding point of each lyric corresponds to a moment when each word or accented word in the lyrics begins to sound.

The computer device 2 can predict a probability of whether each word belongs to the accent, a long tone, and the like through the lyrics when singing. Take the lyric "弯弯的月亮" as an example, when it is predicted that the probability of "亮" being an accent when singing is 99%, then the sounding of "亮" when being sung is regarded as one sounding point, and a time node of the sounding point of "亮" can be the moment when "亮" begins to sound.

The computer device 2 can predict the sounding points of each lyric through various models such as the trained deep neural network model, a long short-term memory network, and so on.

Third, the multiple rhythmic points are the sounding points of each word in the process of performing the cross-talk program.

As mentioned above, if the multimedia file is cross-talk-type audio and video content, the user pays more attention to rhythm of the language.

Therefore, when the multimedia file is cross-talk-type audio and video content, the target audio signal is a human voice signal. That is, the computer device 2 may use the sounding points of each word as the rhythmic points, or the accented sounding points as the rhythmic points.

The above only provides methods for obtaining rhythmic points in several situations, which are not used to limit the scope of protection of the present application.

Figure 6:
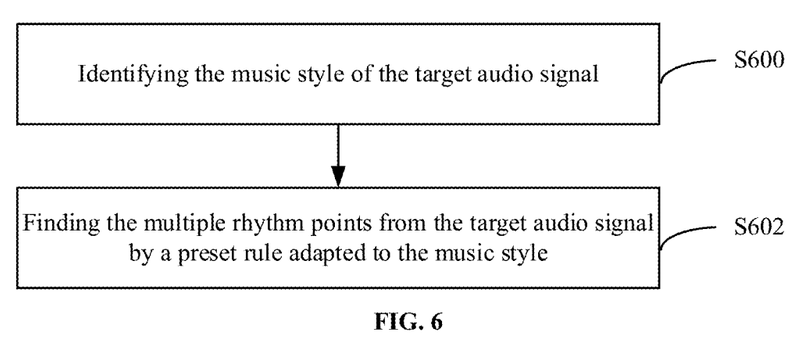
FIG. 6 is another flowchart of sub-steps of step S204 in FIG. 2.

In order to effectively find the rhythmic points that conform to the artistic conception, when the multimedia file is music-type audio and video content, the computer device 2 can search for the rhythmic points based on a music style. As shown in FIG. 6, step S204 may include steps S600 to S602, wherein: step S600, identifying the music style of the target audio signal; and step S602, finding the multiple rhythmic points from the target audio signal by a preset rule adapted to the music style. It should be noted that the preset rule corresponding to a different music style may be predefined, or may be obtained through training on massive audio data sets of the same style.

Step S206, Configuring a Corresponding Interactive Component for Each of the Rhythmic Points.

The interactive component may be various types of touch-sensitive interactive components, such as a point-touch interactive component, a long-press interactive component, and a sliding interactive component. Each type of interactive component can include a variety of components with different shapes and colors.

Figure 7:
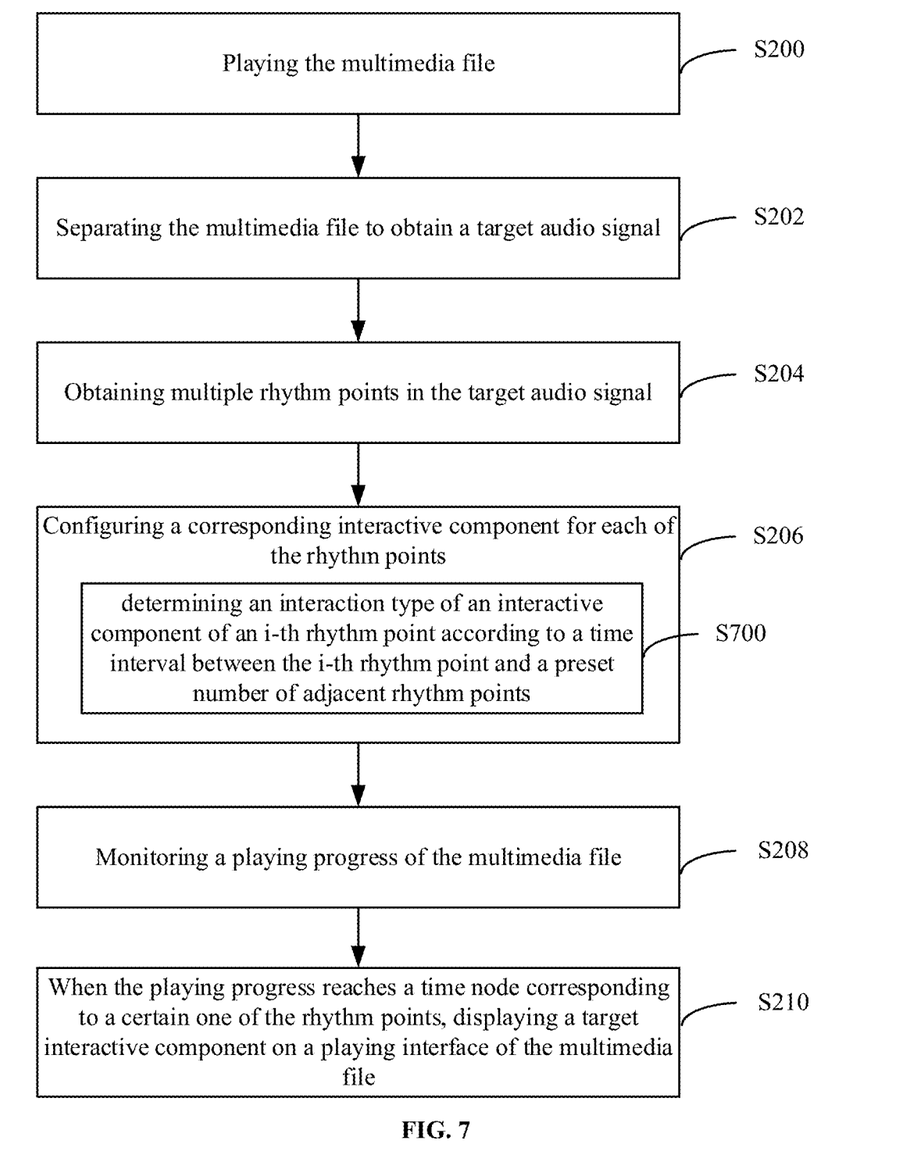
FIG. 7 schematically shows another flowchart of a game playing method based on a multimedia file according to a first embodiment of the present application.

Each of the rhythmic points corresponds to at least one interactive component. The type and spatial location of the interactive component corresponding to each of the rhythmic points can be determined in the following ways:

In the exemplary embodiment, as shown in FIG. 7, step S206 may include step S700, wherein: step S700, determining an interaction type of an interactive component of an i-th rhythmic point according to a time interval between the i-th rhythmic point and a preset number of adjacent rhythmic points; wherein i is a positive integer and i≤N, and the N is a number of the multiple rhythmic points. As the example, for rhythmic points with sparse rhythms, touch-sensitive interactive components may be configured; long-press interactive components are used for parts with dense rhythmic points and singers with drag, and variety and fun interaction is achieved through different forms of strategy combinations based on music styles.

Figure 8:
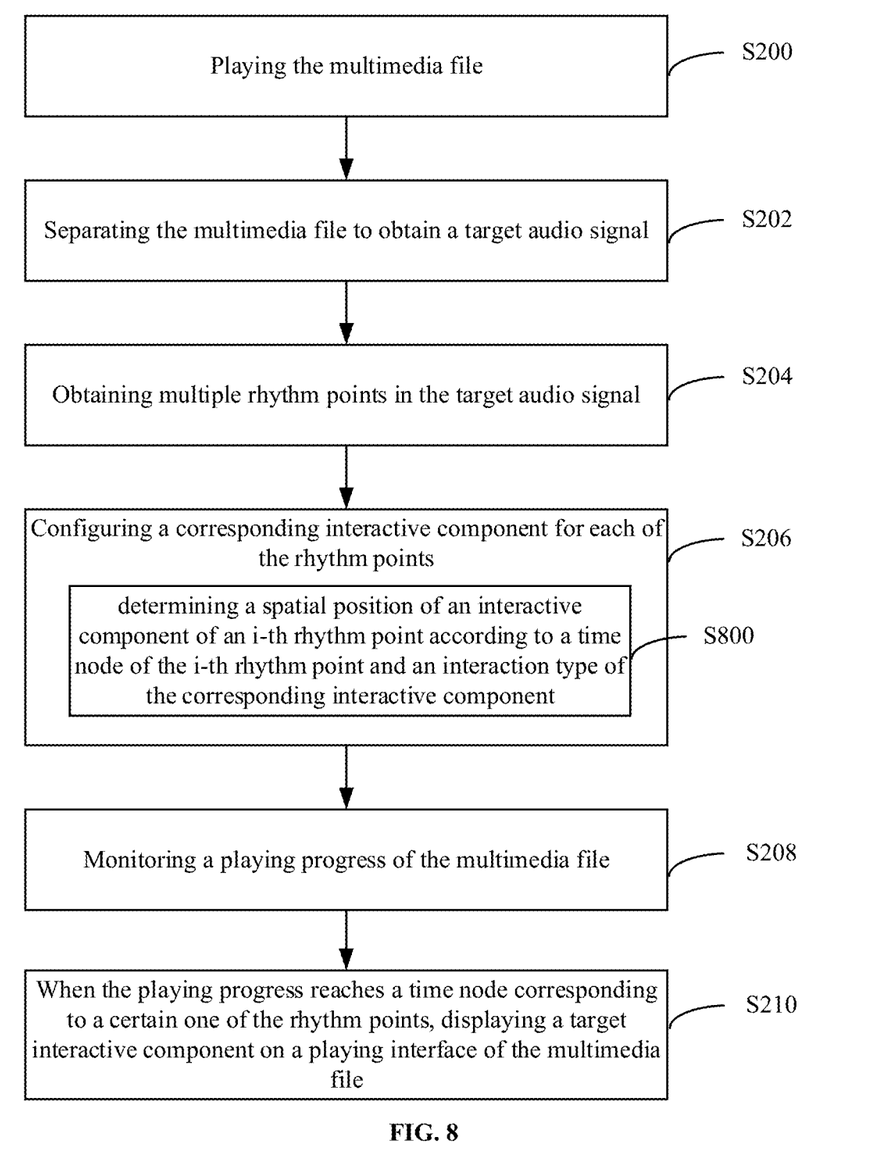
FIG. 8 schematically shows another flowchart of a game playing method based on a multimedia file according to a first embodiment of the present application.

In the exemplary embodiment, as shown in FIG. 8, step S206 may include step S800, wherein: step S800, determining a spatial position of an interactive component of an i-th rhythmic point according to a time node of the i-th rhythmic point and an interaction type of the corresponding interactive component; where i is the positive integer and i≤N, and the N is the number of the multiple rhythmic points. As the example, the computer device 2 can generate the spatial position of each interactive component according to different preset curve fitting distributions. The spatial position may be a relative position of the corresponding interactive component in a playing interface. The spatial positions of all interactive components can be saved in an audio game map, the audio game map can include various related information such as the relative position of each interactive component on the playing interface, a longest continuous display time, and so on. It should be understood that the preset curve fitting distribution is obtained by fitting according to time intervals of the rhythmic points, type of the rhythmic points, and/or setting rules.

Of course, the spatial position of the interactive component of the i-th rhythmic point can also be determined based on a playing screen.

Step S208, Monitoring a Playing Progress of the Multimedia File.

The playing progress is a current playing time point corresponding to the multimedia content (video frame) currently being played. The current playing time point is a relative position point or a progress percentage in a total playing time interval.

Step S210, when the playing progress reaches the time node corresponding to a certain one of the rhythmic points, displaying a target interactive component on the playing interface of the multimedia file; wherein, the target interactive component is an interactive component corresponding to the certain one of the rhythmic points.

The target interactive component can generate a corresponding response according to user's touch operations in a touch area, thereby realizing human-computer interaction.

In the case that the spatial position of the target interactive component has been determined, the computer device 2 can perform the following operations: first, displaying the target interactive component on the playing interface of the multimedia file according to the determined spatial position;

second, monitoring the user's touch operations on the target interactive component; third, generating a corresponding response according to an interactive logic of the target interactive component. Wherein, the corresponding response may include: dynamic changes, disappearance, and other state changes of the target interactive component on the playing interface.

Figure 9:
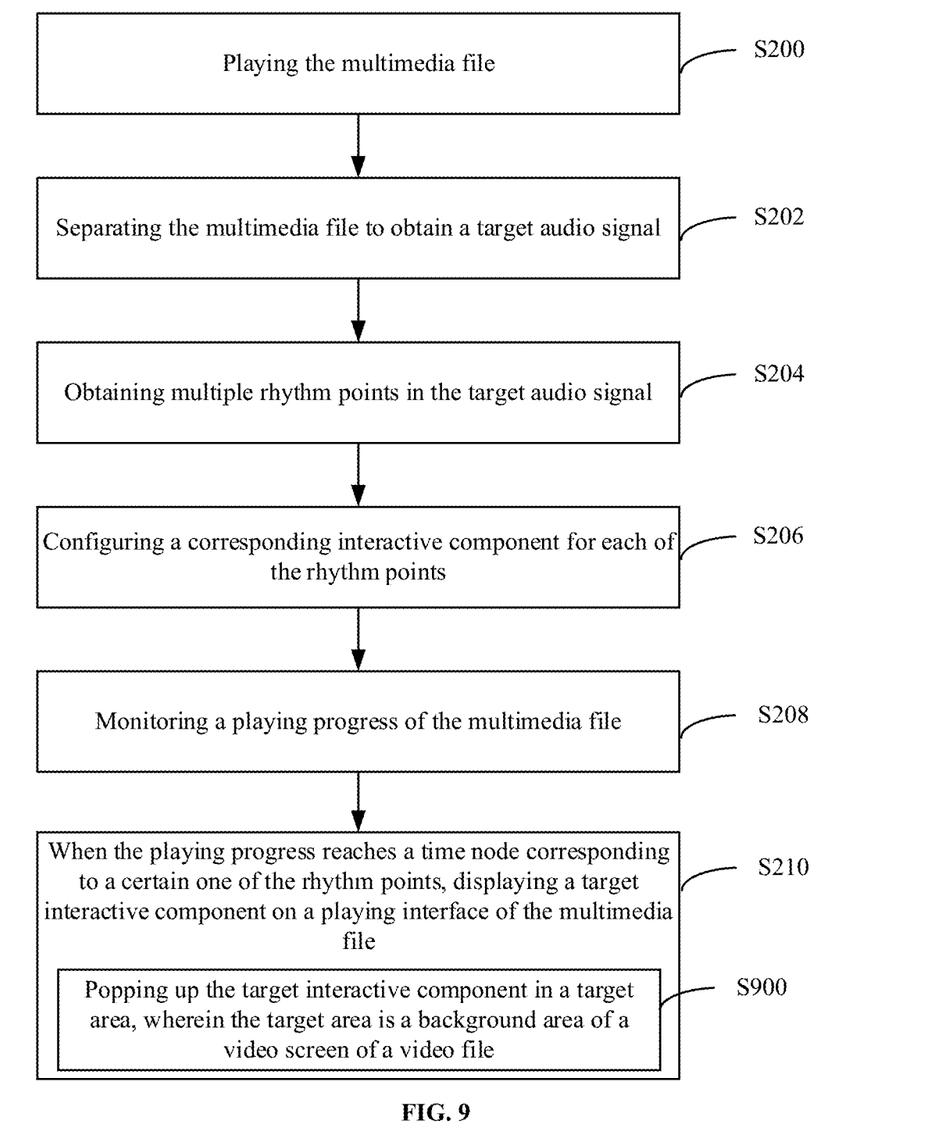
FIG. 9 schematically shows another flowchart of a game playing method based on a multimedia file according to a first embodiment of the present application.

As shown in FIG. 9, in the case that the spatial position of the target interactive component is not determined, the computer device 2 may perform step S900: popping up the target interactive component in a target area, wherein the target area is a background area of a video screen of a video file. As the example, the multimedia file is the video file, and a pop-up time of the target interactive component is 52 minutes and 18 seconds, and the longest duration is 0.5 seconds, which means that: when the video file is played from 52 minutes 18 seconds to 52 minutes 18.5 seconds, the target interactive component may be displayed on the video screen. In this case, if the target interactive component covers a main screen (such as human faces, animals, and so on), the video's viewing experience will be affected. Therefore, the computer device 2 can detect all video frames or several front-row video frames from 52 minutes 18 seconds to 52 minutes 18.5 seconds in the video file, find a part of common background areas of these video frames as much as possible, and display the target interactive component in this part of the background areas. The advantage is that a visual viewing experience of the user is ensured as much as possible, and at the same time, audio interactive games can be performed, which greatly improves the user's experience.

The game playing method based on a multimedia file provided in the embodiments of the present application enables the computer device to automatically detect each of the rhythmic points in the multimedia file during the process of playing the multimedia file, temporarily configure corresponding interactive components for each of the rhythmic points, and pop up and display the corresponding interactive component on the playing interface for interactive operation with the user when the multimedia file is played to the time node corresponding to each rhythmic point. That is to say, in the embodiment, on the premise that the multimedia file itself does not provide interaction, different interactive components can be temporarily configured according to the content of the multimedia, which makes it possible to dynamically pop up temporarily displayed interactive components at different time nodes while outputting visual information and auditory information, thereby interacting with the user on the playing interface of the multimedia file by the interactive components that pop up in real time, the user's experience is improved, and the scope of application is wide.

In the embodiment, the computer device 2 can generate interactive components in real time according to the current playing content, which effectively increases the interactive modes of the audio game, thereby realizing visual, auditory, and human-machine interaction, and improving the user's experience.

A Second Embodiment

Figure 10:
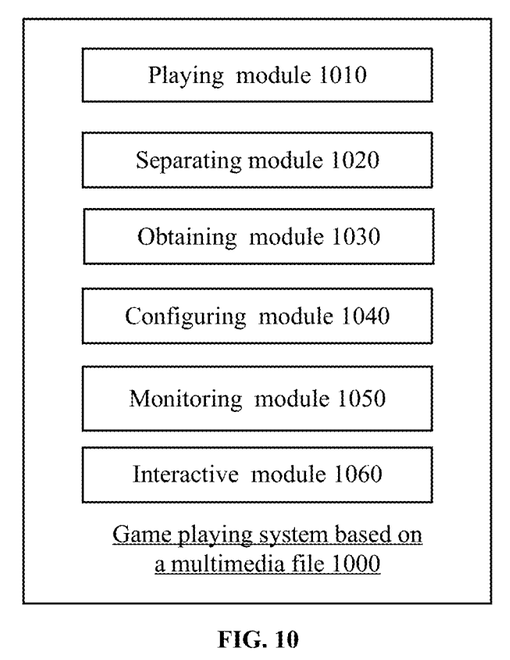
FIG. 10 schematically shows a block diagram of a game playing system based on a multimedia file according to a second embodiment of the present application.

FIG. 10 schematically shows a block diagram of a game playing system based on a multimedia file according to a second embodiment of the present application, the game playing system based on a multimedia file may be divided into one or more program modules, and the one or more program modules are stored in a storage medium and executed by one or more processors to complete the embodiment of the present application. The program modules referred to in the embodiment of the present application refer to a series of computer program instruction segments capable of completing specific functions. The following description will specifically introduce the function of each program module in the embodiment.

As shown in FIG. 10, the game playing system based a multimedia file 1000 may include a playing module 1010, a separating module 1020, an obtaining module 1030, a configuring module 1040, a monitoring module 1050, and an interactive module 1060, wherein:

The playing module 1010, playing the multimedia file.

The separating module 1020, separating the multimedia file to obtain a target audio signal.

The obtaining module 1030, obtaining multiple rhythmic points in the target audio signal.

The configuring module 1040, configuring a corresponding interactive component for each of the rhythmic points.

The monitoring module 1050, monitoring a playing progress of the multimedia file.

The interactive module 1060, when the playing progress reaches a time node corresponding to a certain one of the rhythmic points, displaying a target interactive component on a playing interface of the multimedia file; wherein, the target interactive component is an interactive component corresponding to the certain one of the rhythmic points.

In an exemplary embodiment, the separating module 1020, is further for extracting initial audio signals of the multimedia file; determining a music audio signal and a non-music audio signal in the initial audio signals; and separating the initial audio signals to obtain the target audio signal corresponding to the music audio signal.

In the exemplary embodiment, the obtaining module 1030, is further for detecting the target audio signal to obtain multiple music drums from the target audio signal according to a detection result; and determining each of the music drums as one corresponding rhythmic point.

In the exemplary embodiment, the obtaining module 1030, is further for: obtaining a lyric text of the target audio signal; and predicting a sounding point of each lyric in the lyric text to determine the sounding point of each lyric as one corresponding rhythmic point.

In the exemplary embodiment, the obtaining module 1030, is further for identifying a music style of the target audio signal; and finding the multiple rhythmic points from the target audio signal by a preset rule adapted to the music style.

In the exemplary embodiment, the configuring module 1040, is further for: determining an interaction type of an interactive component of an i-th rhythmic point according to a time interval between the i-th rhythmic point and a preset number of adjacent rhythmic points; wherein i is a positive integer and i≤N, and the N is a number of the multiple rhythmic points.

In the exemplary embodiment, the configuring module 1040, is further for determining a spatial position of an interactive component of an i-th rhythmic point according to a time node of the i-th rhythmic point and an interaction type of the corresponding interactive component; where i is the positive integer and i≤N, and the N is the number of the multiple rhythmic points.

In the exemplary embodiment, the multimedia file is a video file; and the interactive module 1060, is further for popping up the target interactive component in a target area, wherein the target area is a background area of a video screen of the video file.

A Third Embodiment

Figure 11:
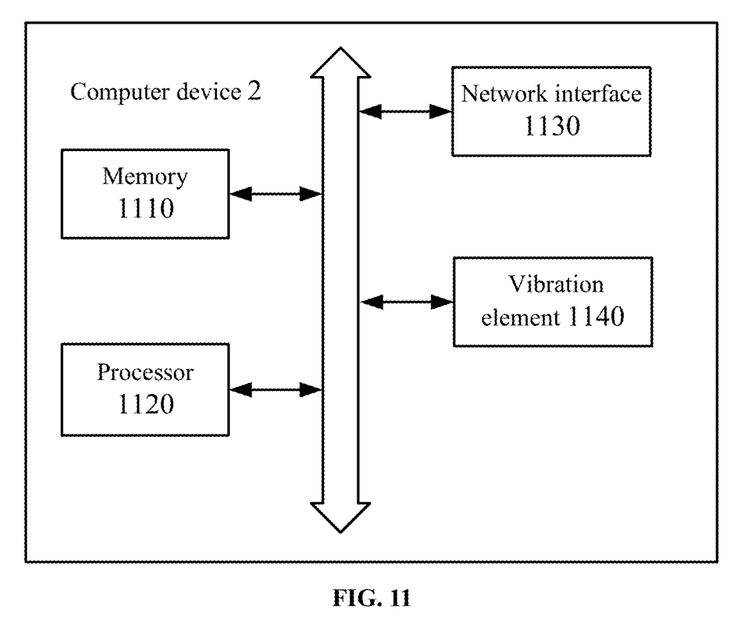
FIG. 11 schematically shows a schematic diagram of a hardware architecture of a computer device suitable for implementing a game playing method based on a multimedia file according to a third embodiment of the present application.

FIG. 11 schematically shows a schematic diagram of a hardware architecture of a computer device 2 suitable for implementing a game playing method based on a multimedia file according to a third embodiment of the present application. In the embodiment, the computer device 2 is a device capable of automatically performing numerical calculations and/or information processing according to predefined or stored instructions, such as can be a smartphone, a tablet, a laptop, a desktop computer, a rack server, a blade server, a tower server or a rack server (including independent servers, or server clusters composed of multiple servers), etc. As shown in FIG. 11, the computer device 2 includes, but is not limited to, a memory 1110, a processor 1120, a network interface 1130, and a vibration element 1140 that can be communicated with each other through a system bus. Wherein:

The memory 1110 includes at least one type of computer-readable storage medium. The readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical dis and so on. In some embodiments, the memory 1110 may be an internal storage module of the computer device 2 such as a hard disk or memory of the computer device 2. In other embodiments, the memory 1110 may also be an external storage device of the computer device 2, such as a plugged hard disk provided in the computer device 2, a smart media card (SMC), secure digital (SD) card, a flash memory card, and so on. Of course, the memory 1110 may also include both an internal storage module and an external storage device of the computer device 2. In the embodiment, the memory 1110 is generally used to store an operating system and various types of application software installed in the computer device 2 such as program codes of the game playing method based on a multimedia file and the like. In addition, the memory 1110 may also be used to temporarily store various types of data that have been or will be outputted.

The processor 1120, in some embodiments, may be a central processing unit (CPU), a controller, a microprocessor, or other data processing chip. The processor 1120 is generally used to control the overall operation of the computer device 2 such as performing control and processing related to data interaction or communication with the computer device 2. In the embodiment, the processor 1120 is used to run program code stored in the memory 1110 or process data.

The network interface 1130 may include a wireless network interface or a wired network interface which is generally used to establish a communication connection between the computer device 2 and other computer devices. For example, the network interface 1130 is used for connecting the computer device 2 to an external terminal via a network and establishing a data transmission channel and a communication connection between the computer device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and so on.

It is to be noted that FIG. 11 shows only the computer device 2 having components 1110-1130, but it is understood that it is not required to implement all of the shown components and that more or fewer parts can be implemented in lieu thereof.

In the embodiment, the game playing method based on a multimedia file stored in the memory 1110 may be divided into one or more program modules and executed by one or more processors (processor 1120 in the embodiment) to complete the embodiment of the present application.

A Fourth Embodiment

The present application further provides a computer-readable storage medium, which stores computer programs, and when the computer programs are executed by a processor to realize the steps of a game playing method based on a multimedia file in the embodiment.

In the embodiment, the computer-readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk and so on. In some embodiments, the computer-readable storage medium may be an internal storage module of the computing device such as a hard disk or memory of the computing device. In other embodiments, the memory may also be an external storage device of the computing device, such as a plugged hard disk provided in the computer device, a smart media card (SMC), a secure digital (SD) card, a flash memory card, and so on. Of course, the computer-readable storage medium may also include both an internal storage module and an external storage device of the computing device. In the embodiment, the computer-readable storage medium is generally used to store an operating system and various types of application software installed in the computing device such as program codes of the game playing method based on a multimedia file and the like. In addition, the memory may also be used to temporarily store various types of data that have been or will be outputted.

Apparently, it should be appreciated by those skilled in the art that each module or step described in the embodiment of the present application can be realized by a general-purpose and that the modules or steps may be integrated on a single computer device or distributed on a network consisting of a plurality of computing devices, optionally, the modules or steps may be realized by executable program codes so that the modules or steps can be stored in a storage device to be executed by a computer device, and in some cases, the steps shown or described herein can be executed in a sequence different from this presented herein, or the modules or steps are formed into integrated circuit modules, or several of the modules or steps are formed into integrated circuit modules. Therefore, the embodiment of the present application is not limited to the combination of specific hardware and software.

The embodiments described above are just preferred embodiments of the present application and thus do not limit the patent scope of the present application. Any equivalent structure, or equivalent process transformation made according to the content of the description and the drawings of the present application or any direct or indirect application to other related arts shall be also included in the patent protection scope of the present application.

What is claimed is:

1. A method of generating and playing games based on a multimedia file, comprising:
   obtaining a target audio signal from the multimedia file;
   determining a plurality of rhythmic points in the target audio signal;
   configuring a plurality of interactive components corresponding to the plurality of rhythmic points based on one or more predetermined rules;
   monitoring a progress of playing the multimedia file; and
   displaying a target interactive component on an interface of playing the multimedia file in response to determining that the progress of playing the multimedia file reaches a time point corresponding to one of the plurality of rhythmic points, wherein the target interactive component is an interactive component among the plurality of interactive components corresponding to the one of the plurality of rhythmic points.

2. The method of claim 1, wherein the obtaining a target audio signal from the multimedia file further comprises:
   extracting initial audio signals from the multimedia file;
   determining a music audio signal and a non-music audio signal in the initial audio signals; and
   obtaining the target audio signal corresponding to the music audio signal by separating the music audio signal from the non-music audio signal.

3. The method of claim 1, wherein the determining a plurality of rhythmic points in the target audio signal further comprises:
   detecting a plurality of music drumbeats in the target audio signal; and
   identifying the plurality of music drumbeats as the plurality of rhythmic points.

4. The method of claim 1, the determining a plurality of rhythmic points in the target audio signal further comprises:
   obtaining lyric text corresponding to the target audio signal;
   predicting a plurality of sounding points corresponding to a plurality of words in the lyric text; and
   identifying the plurality of sounding points as the plurality of rhythmic points.

5. The method of claim 1, wherein the determining a plurality of rhythmic points in the target audio signal further comprises:
   identifying a music style of the target audio signal; and
   determining the plurality of rhythmic points in the target audio signal based on a predetermined rule corresponding to the music style.

6. The method of claim 1, wherein the configuring a plurality of interactive components corresponding to the plurality of rhythmic points based on one or more predetermined rules further comprises:
   determining an interaction type of an interactive component corresponding to an i-th rhythmic point among the plurality of rhythmic points based on a time interval between the i-th rhythmic point and a predetermined number of rhythmic points near the i-th rhythmic point, wherein i represents a positive integer, i≤N, and N represents a total number of the plurality of rhythmic points.

7. The method of claim 1, wherein the configuring a plurality of interactive components corresponding to the plurality of rhythmic points based on one or more predetermined rules further comprises:
   determining a spatial position of an interactive component corresponding to an i-th rhythmic point among the plurality of rhythmic points based on a time of the i-th rhythmic point and an interaction type of the interactive component, where i represents a positive integer, i≤N, the N represents a total number of the plurality of rhythmic points, and the spatial position of the interactive component is a position of the interactive component on the interface.

8. The game of claim 1, wherein the multimedia file is a video file, and wherein displaying a target interactive component on an interface of playing the multimedia file further comprises popping up the target interactive component in a target area of the interface, the target area corresponding to a background area of a video image of the video file.

9. A system of generating live streaming video data, comprising:
   at least one processor; and
   at least one memory communicatively coupled to the at least one processor and comprising computer-readable instructions that upon execution by the at least one processor cause the at least one processor to perform operations comprising:
   obtaining a target audio signal from the multimedia file;
   determining a plurality of rhythmic points in the target audio signal;
   configuring a plurality of interactive components corresponding to the plurality of rhythmic points based on one or more predetermined rules;
   monitoring a progress of playing the multimedia file; and
   displaying a target interactive component on an interface of playing the multimedia file in response to determining that the progress of playing the multimedia file reaches a time point corresponding to one of the plurality of rhythmic points, wherein the target interactive component is an interactive component among the plurality of interactive components corresponding to the one of the plurality of rhythmic points.

10. The system of claim 9, wherein the determining a plurality of rhythmic points in the target audio signal further comprises:
    detecting a plurality of music drumbeats in the target audio signal; and
    identifying the plurality of music drumbeats as the plurality of rhythmic points.

11. The system of claim 9, the determining a plurality of rhythmic points in the target audio signal further comprises:
    obtaining lyric text corresponding to the target audio signal;
    predicting a plurality of sounding points corresponding to a plurality of words in the lyric text; and
    identifying the plurality of sounding points as the plurality of rhythmic points.

12. The method of claim 9, wherein the determining a plurality of rhythmic points in the target audio signal further comprises:
    identifying a music style of the target audio signal; and
    determining the plurality of rhythmic points in the target audio signal based on a predetermined rule corresponding to the music style.

13. The system of claim 1, wherein the configuring a plurality of interactive components corresponding to the plurality of rhythmic points based on one or more predetermined rules further comprises:
    determining an interaction type of an interactive component corresponding to an i-th rhythmic point among the plurality of rhythmic points based on a time interval between the i-th rhythmic point and a predetermined number of rhythmic points near the i-th rhythmic point, wherein i represents a positive integer, i≤N, and N represents a total number of the plurality of rhythmic points.

14. The system of claim 1, wherein the configuring a plurality of interactive components corresponding to the plurality of rhythmic points based on one or more predetermined rules further comprises:
   determining a spatial position of an interactive component corresponding to an i-th rhythmic point among the plurality of rhythmic points based on a time of the i-th rhythmic point and an interaction type of the interactive component, where i represents a positive integer, i≤N, the N represents a total number of the plurality of rhythmic points, and the spatial position of the interactive component is a position of the interactive component on the interface.

15. The system of claim 1, wherein the multimedia file is a video file, and wherein displaying a target interactive component on an interface of playing the multimedia file further comprises popping up the target interactive component in a target area of the interface, the target area corresponding to a background area of a video image of the video file.

16. A non-transitory computer-readable storage medium, storing computer-readable instructions that upon execution by a processor cause the processor to implement operations comprising:
   obtaining a target audio signal from the multimedia file;
   determining a plurality of rhythmic points in the target audio signal;
   configuring a plurality of interactive components corresponding to the plurality of rhythmic points based on one or more predetermined rules;
   monitoring a progress of playing the multimedia file; and
   displaying a target interactive component on an interface of playing the multimedia file in response to determining that the progress of playing the multimedia file reaches a time point corresponding to one of the plurality of rhythmic points, wherein the target interactive component is an interactive component among the plurality of interactive components corresponding to the one of the plurality of rhythmic points.

17. The non-transitory computer-readable storage medium of claim 16, wherein the determining a plurality of rhythmic points in the target audio signal further comprises:
   detecting a plurality of music drumbeats in the target audio signal; and
   identifying the plurality of music drumbeats as the plurality of rhythmic points.

18. The non-transitory computer-readable storage medium of claim 16, the determining a plurality of rhythmic points in the target audio signal further comprises:
   obtaining lyric text corresponding to the target audio signal;
   predicting a plurality of sounding points corresponding to a plurality of words in the lyric text; and
   identifying the plurality of sounding points as the plurality of rhythmic points.

19. The non-transitory computer-readable storage medium of claim 16, wherein the configuring a plurality of interactive components corresponding to the plurality of rhythmic points based on one or more predetermined rules further comprises:
   determining an interaction type of an interactive component corresponding to an i-th rhythmic point among the plurality of rhythmic points based on a time interval between the i-th rhythmic point and a predetermined number of rhythmic points near the i-th rhythmic point, wherein i represents a positive integer, i≤N, and N represents a total number of the plurality of rhythmic points.

20. The non-transitory computer-readable storage medium of claim 16, wherein the configuring a plurality of interactive components corresponding to the plurality of rhythmic points based on one or more predetermined rules further comprises:
   determining a spatial position of an interactive component corresponding to an i-th rhythmic point among the plurality of rhythmic points based on a time of the i-th rhythmic point and an interaction type of the interactive component, where i represents a positive integer, i≤N, the N represents a total number of the plurality of rhythmic points, and the spatial position of the interactive component is a position of the interactive component on the interface.

* * * * *